(12) United States Patent
Poutanen

(10) Patent No.: US 9,507,827 B1
(45) Date of Patent: Nov. 29, 2016

(54) ENCODING AND ACCESSING POSITION DATA

(75) Inventor: Tomi Poutanen, Toronto (CA)

(73) Assignee: EXCALIBUR IP, LLC, Sunnyvale, CA (US)

( * ) Notice: Subject to any disclaimer, the term of this patent is extended or adjusted under 35 U.S.C. 154(b) by 182 days.

(21) Appl. No.: 13/173,532

(22) Filed: Jun. 30, 2011

Related U.S. Application Data

(63) Continuation of application No. 12/731,458, filed on Mar. 25, 2010, now abandoned.

(51) Int. Cl.
*G06F 7/00* (2006.01)
*G06F 17/30* (2006.01)

(52) U.S. Cl.
CPC ..... *G06F 17/3053* (2013.01); *G06F 17/30554* (2013.01)

(58) Field of Classification Search
CPC ............... G06F 17/3053; G06F 17/30554; G06F 17/30864
USPC ........................................................ 707/727
See application file for complete search history.

(56) References Cited

U.S. PATENT DOCUMENTS

| | | | | |
|---|---|---|---|---|
| 4,335,447 A | * | 6/1982 | Jerrim | 714/22 |
| 4,891,771 A | * | 1/1990 | Edel et al. | 715/217 |
| 6,349,308 B1 | * | 2/2002 | Whang et al. | |
| 6,374,232 B1 | * | 4/2002 | Dageville et al. | |
| 6,721,863 B1 | * | 4/2004 | Endo | 711/165 |
| 6,826,672 B1 | * | 11/2004 | Brown et al. | 711/220 |
| 7,398,271 B1 | * | 7/2008 | Borkovsky et al. | |
| 8,219,562 B1 | * | 7/2012 | Rothschild et al. | 707/741 |
| 8,904,032 B2 | * | 12/2014 | Galles | 709/234 |
| 2003/0126116 A1 | * | 7/2003 | Chen et al. | 707/3 |
| 2004/0064666 A1 | * | 4/2004 | Bickerstaff | 711/200 |
| 2004/0205044 A1 | * | 10/2004 | Su et al. | 707/2 |
| 2007/0050384 A1 | * | 3/2007 | Whang et al. | 707/100 |
| 2007/0124350 A1 | * | 5/2007 | Sjoblom et al. | 707/205 |
| 2008/0270484 A1 | * | 10/2008 | Borkovsky et al. | 707/200 |
| 2009/0150605 A1 | * | 6/2009 | Flynn et al. | 711/112 |
| 2009/0216910 A1 | * | 8/2009 | Duchesneau | 709/250 |
| 2010/0228948 A1 | * | 9/2010 | Jaekwan | 711/221 |
| 2011/0093680 A1 | * | 4/2011 | Lordello et al. | 711/173 |

* cited by examiner

*Primary Examiner* — Mark E Hershley
(74) *Attorney, Agent, or Firm* — Pillsbury Winthrop Shaw Pittman LLP

(57) ABSTRACT

In one embodiment, a data structure comprises: a primary index comprising one or more position-block references; and one or more position blocks sequentially following the primary index, wherein: each one of the position-block references corresponds to one of the position blocks; and each one of the position blocks comprises: a secondary index comprising one or more position-data references; and one or more sets of positions sequentially following the secondary index, wherein each one of the position-data references corresponds to of one of the sets of positions in the position block. In one embodiment, an instance of the data structure is stored in a computer-readable memory and accessible by an application executed by a process.

8 Claims, 4 Drawing Sheets

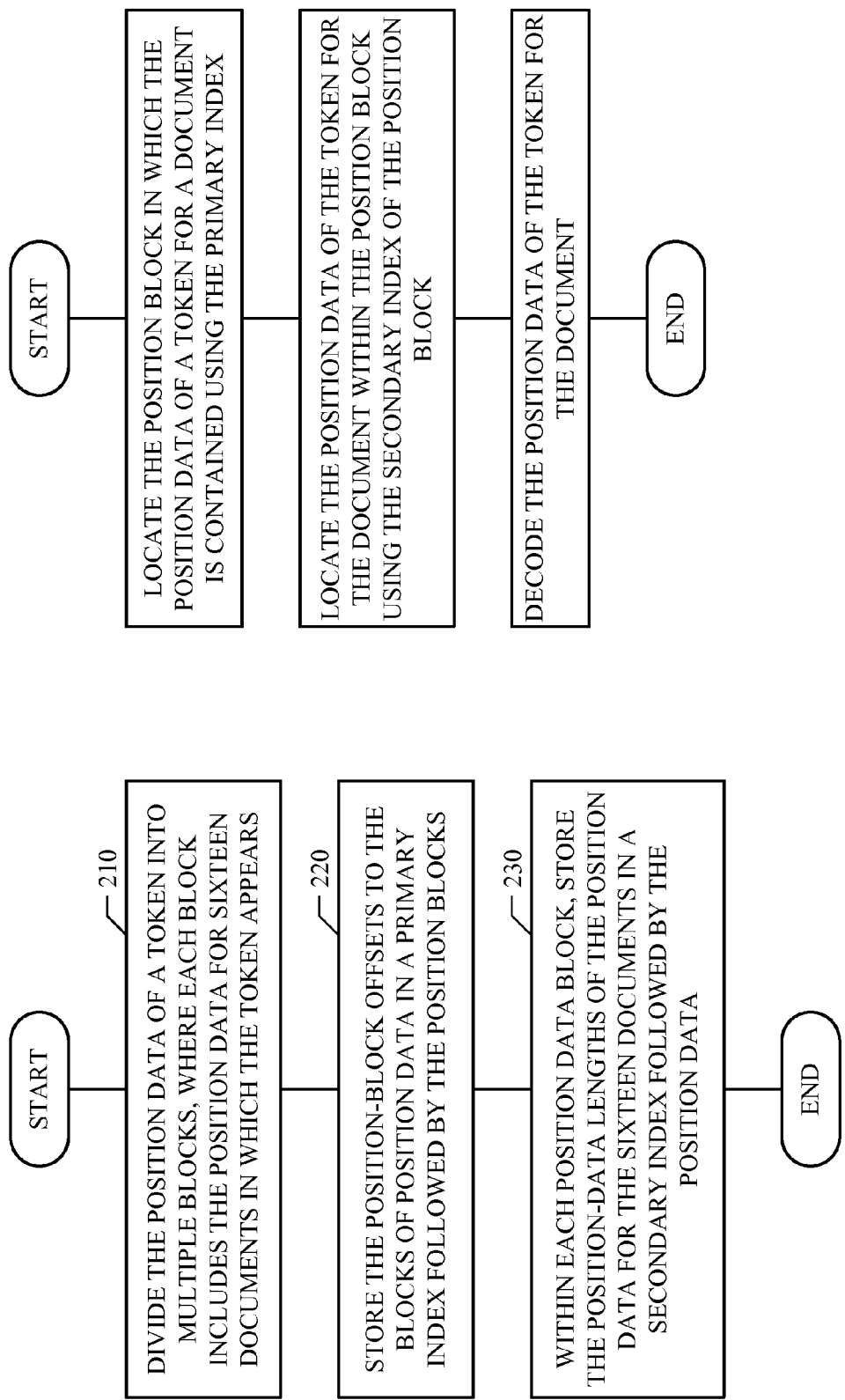

ENCODING AND ACCESSING POSITION DATA

RELATED APPLICATION DATA

This application is a continuation of U.S. patent application Ser. No. 12/731,458 filed Mar. 25, 2010, the entirety of which is incorporated herein by reference to the extent permitted by law.

TECHNICAL FIELD

The present disclosure generally relates to encoding and accessing token position data in an inverted index.

BACKGROUND

In the context of computer science, an inverted index, also referred to as postings file or inverted file, is an index data structure for storing a mapping from content (e.g., words or numbers) to its locations or positions in a database file, a document, or a set of documents. The purpose of an inverted index is to allow fast full text searches, albeit at a cost of increased processing when a document is added to the database. It is the most popular data structure used in document retrieval systems.

One of the applications for an inverted index is in the field of network search engines. The Internet provides a vast amount of information. The individual pieces of information are often referred to as "network resources" or "network content" and may have various formats, such as, for example and without limitation, texts, audios, videos, images, web pages, documents, executables, etc. The network resources are stored at many different sites, such as on computers and servers, in databases, etc., around the world. These different sites are communicatively linked to the Internet through various network infrastructures. Any person may access the publicly available network resources via a suitable network device (e.g., a computer, a smart mobile telephone, etc.) connected to the Internet.

However, due to the sheer amount of information available on the Internet, it is impractical as well as impossible for a person to manually search throughout the Internet for specific pieces of information. Instead, most people rely on different types of computer-implemented tools to help them locate the desired network resources. One of the most commonly and widely used computer-implemented tools is a search engine, such as the search engines provided by Microsoft® Inc. (http://www.bing.com), Yahoo!® Inc. (http://search.yahoo.com), and Google™ Inc. (http://www-.google.com). To search for information relating to a specific subject matter or topic on the Internet, a person typically issues a short phrase or a few keywords, which may be words or numbers, describing the subject matter, often referred to as a "search query" or simply "query", to a search engine. The search engine conducts a search based on the search query using various search algorithms and generates a search result that identifies network resources that are most likely to be related to the search query. The network resources are presented to the person, often in the form of a list of links, each link being associated with a different network document (e.g., a web page) that contains some of the identified network resources.

The network documents may each include any number of words or numbers or symbols, and each word or number or symbol may be referred to as a token. An inverted index may be used to store a mapping from the tokens in the network documents to their positions in the network documents. Upon receiving a search query from a person, a search engine uses an inverted index to determine which network documents contain all or most or some of the query keywords. This improves the speed of the search process. Typically, about two-thirds of an inverted index are the position data of the tokens in the documents (i.e., the individual positions of the tokens in the documents).

Sophisticated search engines implement many other functionalities in addition to merely identifying the network resources as a part of the search process. For example, a search engine usually ranks the identified network resources according to their relative degrees of relevance with respect to the search query, such that the network resources that are relatively more relevant to the search query are ranked higher and consequently are presented to a person requesting a search before the network resources that are relatively less relevant to the search query. The search engine may also provide a short summary of each of the identified network resources. There are continuous efforts to improve the qualities of the search results generated by the search engines. Accuracy, completeness, presentation order, and speed are but a few of the performance aspects of the search engines for improvement.

SUMMARY

The present disclosure generally relates to encoding and accessing token position data in an inverted index.

In particular embodiments, a data structure comprises: a primary index comprising one or more position-block references, and one or more position blocks sequentially following the primary index. Each one of the position-block references corresponds to one of the position blocks. Each one of the position blocks comprises: a secondary index comprising one or more position-data references; and one or more sets of positions sequentially following the secondary index. Each one of the position-data references corresponds to one of the sets of positions in the position block. In particular embodiments, an instance of the data structure is used to encode the position data of a token. In particular embodiments, one or more instances of the data structure are stored in a computer-readable memory and accessible by an application executed by a process.

In particular embodiments, a method for encoding the position data of a token using an instance of the data structure comprises: accessing position data of a token for one or more documents, wherein the token appears in each one of the documents at one or more positions in the document, and the position data comprises one or more sets of positions of the token appearing in the documents; dividing the sets of positions into one or more position blocks; storing one or more position-block offsets referencing the position blocks in a primary index in the instance of the data structure; and storing the position blocks sequentially following the primary index in the instance of the data structure, wherein storing one of the position blocks comprises: storing one or more position-data lengths a secondary index of the position block, wherein each one of the position-data lengths equals a total size of one of the sets of positions in the position block; and storing the sets of positions in the position block sequentially following the secondary index.

In particular embodiments, a method for accessing the position data of a token encoded in an instance of the data structure comprises: accessing the instance of the data structure used to encode the position data of the token; and accessing one of the sets of positions corresponding to one of the documents, comprising: determining in which one of the position blocks the set of positions is stored based on an index of the document among the documents; decoding the primary index to obtain one of the position-block offsets corresponding to the position block in which the set of positions is stored; determining a first memory location at the beginning of the position block in which the set of positions is stored using the corresponding one of the position-block offsets in the primary index; decoding the secondary index of the position block to obtain one or more of the position-data lengths corresponding to one or more of the sets of positions within the position block from the first one of the sets of positions to the set of positions; determining a second memory location at the beginning of the set of positions using the one or more of the position-data lengths; and decoding the set of positions starting at the second memory location to obtain the positions at which the token appears in the document.

These and other features, aspects, and advantages of the disclosure are described in more detail below in the detailed description and in conjunction with the following figures.

BRIEF DESCRIPTION OF THE DRAWINGS

FIG. 2 illustrates an example method for storing the position data of a token in an instance of the example data structure as illustrated in FIG. 1.

FIG. 3 illustrates an example method for accessing the position data of a token stored in an instance of the example data structure as illustrated in FIG. 1.

DETAILED DESCRIPTION

Figure 1:
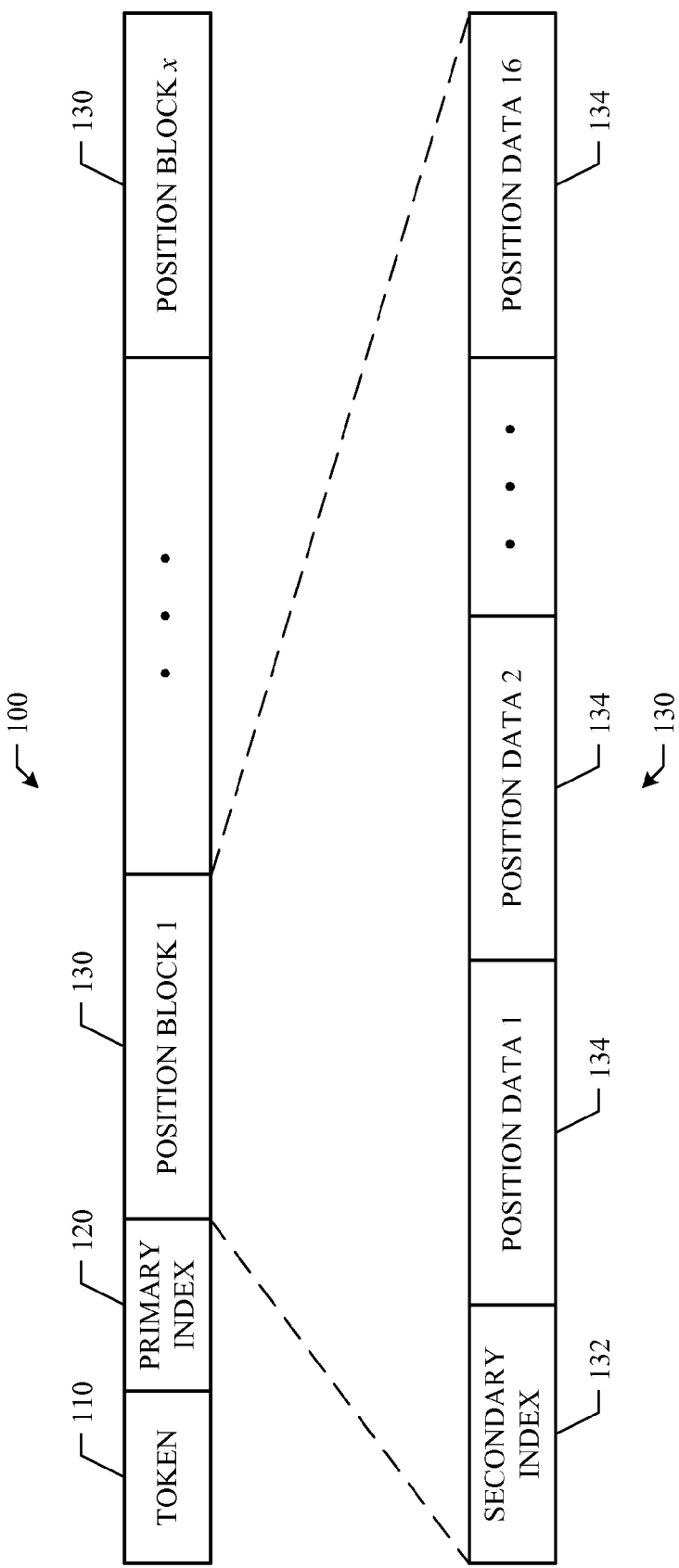
FIG. 1 illustrates an example data structure for encoding the position data of a token.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A document may include any number of words or numbers, and each word or number may be referred to as a "token". Thus, a document may include any number of tokens. In general, an inverted index is a data structure that may be used to map individual tokens in a set of documents to their positions in the set of documents. Let $D=\{d_1, \ldots, d_{n^D}\}$ denote a set of documents, where $n^D$ is the total number of documents in D such that $n^D \geq 1$, and $d_i \in D$. Each document, $d_i$, contains a set of tokens. In particular embodiments, a token may be alphanumerical and may include any number of alphabetical letters or numerical digits or a combination of both. In particular embodiments, each document, $d_i$, may be assigned a unique identifier within the set, with which the document may be identified or referenced. Let $W=\{w_1, \ldots, w_{n^W}\}$ denote a set of distinct tokens that appear in all of the documents in D, where $n^W$ is the total number of distinct tokens contained in all of the documents in D such that $n^W \geq 1$, and $w_j \in W$. Note that a given token, $w_j$, may appear in any number of documents and within a given document, $d_i$, $w_j$ may appear any number of times.

For a token $w_j$ that appears in a document $d_i$, the positions of $w_j$ within $d_i$ may be determined. In particular embodiments, for a given token, its positions in a given document is the number of tokens at which it appears in the document counting from the beginning (i.e., the first token) of the document. For example, the position of the first token in a document is one; the position of the second token in a document is two; and the position of the nth token in a document is n. Consequently, for each token in W that appears in any number of the documents in D, its positions in each one of the documents in which it appears may be determined. An inverted index may be used to record the positions of all of the tokens in all of the documents in which they appear respectively.

With software programming convention, indexing often begins with 0 instead of 1. Following this convention, the first element in a set or an array has index 0; the second element has index 1; and so on. If the software programming convention is applied to referencing the positions of the tokens in a document, then the position of the first token in the document is 0; the position of the second token in the document is 1; and so on. However, although particular embodiments of the present disclosure may be implemented as computer software, these embodiments are described without following the software programming convention with respect to the indexing scheme. That is, in the present disclosure, all indexing beings with 1, not 0.

Applying the inverted index to network search, suppose the set of documents, D, includes various types of documents on a network (e.g., the Internet), such as, for example and without limitation, web pages, Microsoft Token documents, text documents, or Adobe Portable Document Format (PDF) documents. Each network document includes a set of tokens. An inverted index may be used to record the positions of all the distinct tokens within all of the network documents in which they appear.

For example, suppose a particular token, $w_1$, appears in four documents, $d_5$, $d_{13}$, $d_{38}$, and $d_{192}$, in D. Further suppose that $w_1$ appears twice in $d_5$ at positions 13 and 92, once in $d_{13}$ at position 6, three times in $d_{38}$ at positions 55, 67, and 201, and twice in $d_{192}$ at positions 41 and 137. Note that only four documents and small numbers of positions are used to simplify the discussion. In practice, a token may appear in any number of documents and any number of times in each document. Then for $w_1$, its positions in the four documents in which it appears are: 13, 92, 6, 55, 67, 201, 41, 137. In particular embodiments, the positions of a token in all the documents in which it appears are ordered according to the document order within the document set and the appearance order within each document. For example, because $d_5$ has a smaller index than $d_{13}$ in D, the positions of $w_1$ in $d_5$ (i.e., 13 and 92) are placed in front of the positions of $w_1$ in $d_{13}$ (i.e., 6).

In particular embodiments, for a given token, all the positions of the token from all the documents in which the token appears (e.g., positions 13, 92, 6, 55, 67, 201, 41, and 137 for $w_1$) is called the "position data" of that token. Similarly, for a given token and a given document in which the token appears, all the positions of the token in that document (e.g., positions 13 and 92 for $w_1$ and $d_5$) is called the position data of the token for that document. In particular embodiments, the position data of all the distinct tokens in a set of documents form the inverted index for the set of documents.

By examining and comparing the position data of the individual tokens, particular embodiments may determine, within each document, which tokens are located relatively closely to each other and which tokens are located relatively far apart from each other. In other words, the position data of the tokens indicate, within a document, which tokens are adjacent to each other. For example, suppose another token, $w_2$, appears in three documents, $d_{13}$, $d_{26}$ and $d_{38}$. Further suppose that $w_2$ appears twice in $d_{13}$ at positions 202 and 359, three times in $d_{26}$ at position 43, 55, and 172, and twice in $d_{38}$ at positions 56 and 64. The position data of $w_2$ thus includes 202, 359, 43, 55, 172, 56, and 64. By examining and comparing the documents in which $w_1$ and $w_2$ each appear and the position data of $w_1$ and $w_2$, particular embodiments may determine that: (1) $w_1$ and $w_2$ both appear in $d_{13}$ and $d_{38}$; (2) in $d_{13}$, $w_1$ and $w_2$ are located relatively far apart from each other ($w_1$ appears at position 6, but $w_2$ appears at positions 202 and 359); and (3) in $d_{38}$, $w_1$ and $w_2$ are located relatively closely to each other in two instances ($w_1$ appears at positions 55 and 67, and $w_2$ appears at positions 56 and 64, respectively).

In the context of network search, given a search query that includes any number of tokens, a search engine may examine the position data of each or some of the query tokens to determine which network documents contain all or most or some of the query tokens. For example, if a network document contains all or most of the query tokens, then the search engine may consider that network document to be relatively more relevant to the search query. On the other hand, if a network document contains only some or a few of the query tokens, then the search engine may consider that network document to be relatively less relevant to the search query. In addition, the search engine may examine the proximity of the query tokens within a network document. For example, if a network document contains all of the query tokens and they are located relatively closely to each other within the network document, then the search engine may consider that network document to be relatively more relevant to the search query. On the other hand, if a network document contains all of the query tokens but they are located relatively far apart from each other within the network document, then the search engine may consider that network document to be relatively less relevant to the search query.

In practice, there are billions of network documents on the Internet, and each network document may contain hundreds or thousands of tokens. More and more new network documents become available as time passes. A particular token, especially a commonly used token, may appear in thousands or millions of different network documents and many times within each network document, which means the position data of the token may be very large and contain many positions in many network documents. An inverted index may include at least the position data of most of the distinct tokens contained in most of the network documents. Needless to say, storing such a large amount of position data takes a large amount of storage space. A search query often includes multiple query tokens, causing a search engine to access and process the position data of multiple tokens. Consequently, it is important to determine efficient means to store and access an inverted index (i.e., the position data of the tokens).

FIG. 1 illustrates an example data structure 100 for encoding the position data of a single token. In particular embodiments, multiple instances of data structure 100 may be used to encode the position data of multiple tokens. Given a token, $w_j$, suppose $w_j$ appears in a set of documents, $$D^j = \{d_1^j, \ldots, d_{n^{D^j}}^j\},$$

where $n^{D^j}$ is the total number of documents in $D^j$ such that $1 \leq n^{D^j} \leq n^D$, and $D^j$ is a subset of D such that $D^j \subseteq D$. In each document $d_i^j \in D^j$, $w_j$ may appear any number of times, and there is a set of positions that $w_j$ appears in $d_i^j$ (i.e., the position data of $w_j$ for $d_i^j$). Let $$P^{j,i} = \{p_1^{j,i}, \ldots, p_{n^{P^{j,i}}}^{j,i}\}$$

denote the set of positions that $w_1$ appears in $d_i^j$, where n is the total number of times $w_j$ appears in $d_i^j$ and $n^{P^{j,i}} \geq 1$. In fact, $P^{j,i}$ is the position data of $w_j$ for $d_i^j$. In particular embodiments, the position data of $w_j$ includes all of the sets of positions of $w_j$ appearing in all of the documents in $D^j$; that is, $P^{j,1}, \ldots,$ $$P^{j,n^{D^j}}.$$

Note that since there are a total of $n^{D^j}$ documents in $D^j$, the position data of $w_j$ includes a total of $n^{D^j}$ sets of positions.

In particular embodiments, the position data of $w_j$ (i.e., the $n^{D^j}$ sets of positions) are divided into a number of blocks, where each block includes the same number of sets of positions, with the exception of the last block possibly including less number of sets of positions. The blocks may each include any number of sets of positions (e.g., 8, 16, or 24 sets of positions per block). In particular embodiments, each block may include sixteen sets of positions corresponding to sixteen of the documents in $D^j$. That is, the first block includes the first sixteen sets of positions corresponding to documents one to sixteen from $D^j$ (i.e., the first sixteen documents in which $w_j$ appears); the second group includes the second sixteen sets of positions corresponding to documents seventeen to thirty-two from $D^j$ (i.e., the second sixteen documents in which $w_j$ appears); and so on. Thus, there are a total of $\lceil n^{D^j}/16 \rceil$ blocks, with each block including sixteen sets of positions. Note that if $n^{D^j}$ is not divisible by 16, the last group may have less than sixteen sets of positions. Furthermore, although the present disclosure describes data structure 100 where each position block field 130 includes sixteen sets of positions, the same concept may be applied to, with appropriate computational adjustments, alternative cases where each position block field 130 includes different numbers of sets of positions.

In particular embodiments, data structure 100 may include the following fields: a "token" field 110, followed by a "primary index" field 120, and followed by $\lceil n^{D^j}/16 \rceil$ number of "position block" fields 130. In particular embodiments, token field 110 is for storing the token itself; that is, the token (e.g., $w_j$) for which the position data are to be encoded in the instance of data structure 100 is stored in token field 110 of the instance.

The position data of $w_j$ has been divided into $\lceil n^{D^j}/16 \rceil$ blocks, where $n^{D^j}$ is the total number of documents in which $w_j$ appears. Each block includes the position data for sixteen of the documents in which $w_j$ appears (i.e., sixteen sets of positions corresponding to the sixteen documents), with the exception of the last block that may include less than sixteen sets of positions if $n^{D^j}$ is not divisible by 16. Each block may be referred to as a "position block". In particular embodiments, each block of the position data of $w_j$ is contained in one of position block fields 130. More specifically, position block 1 includes the position data for the first sixteen documents in which $w_j$ appears; position block 2 includes the position data for the second sixteen documents in which $w_j$ appears; and so on. Note that different instances of data structure 100 may have different number of position block fields 130, because different tokens may appear in different number of documents and thus have different number of sets of positions in their respective position data.

In particular embodiments, storing the sixteen sets of positions of each position block requires a certain amount of storage space (e.g., some number of bits). Thus, each position block field 130 requires a certain amount of storage space. Similarly, storing $w_j$ in token field 110 and the position-block offsets (described below) in primary index field 120 also requires a certain amount of storage space. In order to quickly access a particular block of position data, it may be convenient to record the beginning location (e.g., memory location) of each position block field 130 within an instance of data structure 100.

In particular embodiments, each position block field 130 is byte aligned. In particular embodiments, the beginning memory location of each position block field 130 in an instance of data structure 100 may be referenced as an absolute offset (e.g., in number of bytes) from the beginning memory location of the instance of data structure 100 to the beginning memory location of that position block field 130. Since each position block field 130 is byte aligned, the beginning memory location of each position block field 130 is always at a byte boundary in memory. These offsets may be referred to as "position-block" offsets. In particular embodiments, primary index field 120 is for storing all of the position-block offsets. In the case of $w_j$, since there are a total of $\lceil n^{D^j}/16 \rceil$ position block fields 130, there are a total of $\lceil n^{D^j}/16 \rceil$ position-block offsets contained in primary index field 120. In particular embodiments, the position-block offsets may be stored as a lookup table in primary index field 120, with each table entry corresponding to one of the position-block offsets.

To describe data structure 100 more clearly, consider the token, $w_j$, that appears in $D^j$. Using an instance of data structure 100 to encode the position data of $w_j$, in particular embodiments, $w_j$ itself is stored in token field 110. The positions of $w_j$ in documents $d_1^j$ to $d_{16}^j$ are encoded in position block 1; the positions of $w_j$ in documents $d_{17}^j$ to $d_{32}^j$ are encoded in position block 2; and so on. Suppose it takes 6 bytes to encode $w_j$, 24 bytes to encode the position-block offsets (i.e., the primary indices), 46 bytes to encode the position block of $w_j$ in documents $d_1^j$ to $d_{16}^j$, and 36 bytes to encode the position block of $w_j$ in documents $d_{17}^j$ to $d_{32}^j$. Then, in primary index field 120, the first position-block offset is the absolute byte offset for position block 1 from the beginning memory location of the instance of data structure 100, which is 6+24=30; the second position-block offset is the absolute byte offset for position block 2, which is 6+24+46=76; the third position-block offset is the absolute byte offset for position block 3; which is 6+24+46+36=112; and so on.

In particular embodiments, the position-block offsets contained in primary index field 120 for position block fields 130 may be encoded using a minimum constant-bit encoding scheme. Particular embodiments may examine all of the position-block offsets contained in primary index field 120 and determine the minimum number of bits necessary to represent (i.e., encode) the largest position-block offset. Then, particular embodiments may encode all of the position-block offsets in primary index field 120 using this same number of bits. Since this number of bits are sufficient to represent the largest position-block offset, they are also sufficient to represent the smaller position-block offsets in primary index field 120. With the above example for $w_j$, suppose there are three position-block offsets in primary index field 120: 30, 76, and 112. The largest position-block offset of the three is 112. It takes at least seven bits to represent the number 112, because the number 112 in binary form is 1110000. Thus, all three position-block offsets, 30, 76, and 112, are each encoded using seven bits. If position_len is the size, in number of bits, of the position data of a token, with the minimum constant-bit encoding scheme, each position-block offset in primary index field 120 may be encoded using $1+\log_2$ (position_len) number of bits. Other suitable encoding schemes may be used to encode the position-block offsets in primary index field 120 in alternative embodiments, and the present disclosure contemplates any suitable encoding schemes.

In particular embodiments, each one of position block fields 130 is for storing the position data of sixteen of the documents in which the token appears. In particular embodiments, each one of position block fields 130 may include the following fields: a "secondary index" field 132, followed by sixteen position data fields 134, where each position data field 134 includes one set of positions of the token appearing in one of the sixteen documents within that position block field 130. More specifically, position data 1 is the positions of the token appearing in the first document within an position block field 130; position data 2 is the positions of the token appearing in the second document within the position block field 130; and so on; and position data 16 is the positions of the token appearing in the sixteenth document within the position block field 130. Note that the last position block field 130 (e.g., position block $\lceil n^{D^j}/16 \rceil$ in the case of $w_j$) in an instance of data structure 100 may not always have exactly sixteen (i.e., may have less than sixteen) position data fields 134.

In particular embodiments, storing a set of positions requires a certain amount of storage space (e.g., some number of bits). Thus, each position data field 134 requires a certain amount of storage space. The size of each position data field 134 may be referred to as the "position-data length" of that position data field 134. In particular embodiments, the position-data length of each position data field 134 may be measured in number of bits. Similarly, storing the position-data lengths (described below) in secondary index field 132 also requires a certain amount of storage space. In particular embodiments, the beginning memory location of each position data field 134 within an position block field 130 may be referenced as an absolute offset (e.g., in number of bits) from the beginning memory location of that position block field 130 to the beginning memory location of that position data field 134. These offsets may be referred to as "position-data offsets". Note that in particular embodiments, each position block field 130 is byte aligned, and thus, the beginning memory location of a position block field 130 is always at a byte boundary.

In particular embodiments, information used to reference each of the position data fields 134 within a position block field 130 is stored in secondary index field 132 of that position block field 130. There are different ways to store such information in a secondary index field 132 of a position block field 130.

In particular embodiments, the position-data lengths of all of the position data fields 134 in a position block field 130 may be stored in secondary index field 132 of that position block field 130. Since there are a total of sixteen position data fields 134 within each position block field 130, with the possible exception of the last position block field 130, there are a total of sixteen position-data lengths contained in secondary index field 132. Each position-data length may be encoded using any number of bits or bytes. In particular embodiments, each position-data length contained in secondary index field 132 may be encoded using one byte. Thus, secondary index field 132 includes sixteen bytes representing sixteen position-data lengths. If there are less than sixteen position data fields 134 in the last position block field 130 in an instance of data structure 100, then the position-data lengths for the unused position data fields 134 may be set to a default number (e.g., 0) in secondary index field 132. In this case, secondary index field 132 itself requires 128 bits of storage space.

Alternatively, in other embodiments, the position-data offsets of all of the position data fields 134 in a position block field 130 may be stored in secondary index field 132 of that position block field 130. Again, since there are a total of sixteen position data fields 134 within each position block field 130, with the possible exception of the last position block field 130, there are a total of sixteen position-data offsets contained in secondary index field 132. Each position-data offset may be encoded using any number of bits or bytes. In particular embodiments, each position-data offset contained in secondary index field 132 is encoded using one byte. Thus, secondary index field 132 includes sixteen bytes representing sixteen position-data offsets. If there are less than sixteen position data fields 134 in the last position block field 130 in an instance of data structure 100, then the position-data offsets for the unused position data fields 134 may be set to a default number (e.g., 0) in secondary index field 132. Secondary index field 132 itself requires 128 bits of storage space.

For example, suppose within position block 2 of $w_j$, it takes a total of 16 bits to encode the position numbers of $w_j$ in the first document in position block 2 (i.e., $d_{17}{}^j$), 14 bits to encode the position numbers of $w_j$ in the second document in position block 2 (i.e., $d_{18}{}^j$), 28 bits to encode the position numbers of $w_j$ in the third document in position block 2 (i.e., $d_{19}{}^j$), and so on.

Suppose the position-data lengths are stored in secondary index field 132 of position block 2. Then, in secondary index field 132 of position block 2, the first position-data length is 16; the second position-data length is 14; the third position-data length is 28; and so on. The beginning memory location (i.e., the position-data offset) of each position data field 134 within position block 2 may be computed based on these position-data lengths. For position data 1 of position block 2, its position-data offset equals 128 bits, which is the storage space needed for secondary index 132. For position data 2 of position block 2, its position-data offset equals 128+16=144 bits, which is the storage space needed for secondary index 132 plus the storage space needed for position data 1. For position data 3 of position block 2, its position-data offset equals 128+16+14=158 bits, which is the storage space needed for secondary index 132 plus the storage space needed for position data 1 plus the storage space needed for position data 2. For position data 4 of position block 2, its position-data offset equals 128+16+14+28=186 bits, which is the storage space needed for secondary index 132 plus the storage space needed for position data 1 plus the storage space needed for position data 2 plus the storage space needed for position data 3. The position-data offsets for subsequent position data fields 134 may be similarly computed.

Alternatively, suppose the position-data offsets are stored in secondary index field 132 of position block 2. Then, in secondary index field 132 of position block 2, the first position-data offset is the offset in bits, from the beginning memory location of position block 2 to the beginning memory location of position data 1 of position block 2, which is 128 (secondary index field 132 itself takes 16 bytes, which is 128 bits); the second position-data offset is the offset in bits, from the beginning memory location of position block 2, to the beginning memory location of position data 2 of position block 2, which is 128+16=144; the third position-data offset is the offset in bits, from the beginning memory location of position block 2, to the beginning memory location of position data 3 of position block 2, which is 128+16+14=158; the fourth position-data offset is the offset in bits, from the beginning memory location of position block 2, to the beginning memory location of position data 4 of position block 2, which is 128+16+14+28=186; and so on.

In particular embodiments, since in secondary index field 132, each position-data length is represented using one byte, the largest length number that may be represented using one byte is 255. Sometimes, however, a token, especially a commonly used token (e.g., the token "the") may appear a large number of times in a single document. As a result, the position data of the token for this document may include a large number of positions and require many bits to encode. If the position data of the token for a document requires more than 255 bits to encode, then the position-data length in secondary index 132 for this document cannot be represented using a single byte. In this case, particular embodiments may store a default number (e.g., 0) as the position-data length for this document in secondary index field 132. Moreover, the actual position data of the token for this document is stored at the end of the corresponding position block field 130 (i.e., in position data 16), even though the document may not be the last document (i.e., the sixteenth document) within that position block. Particular embodiments may optionally store the actual position-data length, in number of bits, of the position data together with the position data at the end of position block field 130, although it is not absolutely necessary to store the length of the position data when there is only one set of positions that requires more than 255 bits to encode within an position block.

On the other hand, if, within the same position block, there are multiple sets of positions for multiple documents that each require more than 255 bits to encode, then the position-data length for all such sets of positions in secondary index field 132 may be set to the same default number (e.g., 0). Theses sets of positions may all be stored at the end of the corresponding position block field 130 (e.g., sequentially). Furthermore, in particular embodiments, for each set of positions that requires more than 255 bits to encode and is stored at the end of a position block field 130, the actual position-data length (e.g., in number of bits) of the set of positions is stored together with the set of positions, and this length may be used to determine the beginning and the end memory locations of each set of positions when needed (e.g., when accessing the position data).

In particular embodiments, within a position block field 130, each position data field 134 is for storing the positions of the token appearing in a particular document in that position block field 130. A token may appear one or more times in a document; thus, there may be one or more positions of the token for the document. Consider token $w_j$ that appears in document $d_i^j$ has positions $P^{j,i}$. In particular embodiments, $$p_1^{j,i},$$

$$\ldots,$$

$$p_{n_P^{j,i}}^{j,i}$$

are stored in one of position data fields 134 of one of position block fields 130, depending on the index of $d_i^j$ within $D^j$. Each position number, $p_k^{j,i} \in P^{j,i}$, represents the position of one particular appearance of $w_j$ in $d_i^j$ counting from the beginning (i.e., the first token) of $d_i^j$. Thus, $p_1^{j,i}$ is the position of the first appearance of $w_j$ in $d_i^j$; $p_2^{j,i}$ is the position of the second appearance of $w_j$ in $d_i^j$; and so on. When storing the positions of a token appearing in a document, particular embodiments may store the absolute position numbers of the token appearances in the document. Alternatively, particular embodiments may store the relative position numbers of the token appearances in the document.

In the former case with the absolute position numbers, for each token appearance in a document, the absolute position of the token appearance is the number of tokens counted from the first token of the document to that token appearance. In the case of $w_j$ and $d_i^j$, the position data field 134 associated with $d_i^j$ contains $$p_1^{j,i},$$

$$\ldots,$$

$$p_{n_P^{j,i}}^{j,i}.$$

In the later case with the relative position numbers, the first token appearance has an absolute position number, counting from the first token of the document to the first appearance of the token in the document. For all subsequent appearances of the token in the document, the difference in positions between each appearance and its previous appearance is stored. In the case of $w_j$ and $d_i^j$, the position data field 134 associated with $d_i^j$ contains $$p_1^{j,i},$$

$$p_2^{j,i} - p_1^{j,i},$$

$$\ldots,$$

$$p_{n_P^{j,i}}^{j,i} - p_{n_P^{j,i}-1}^{j,i}.$$

In particular embodiments, the positions, either absolute or relative, in each position data field 134 may be encoded using a minimum constant-bit encoding scheme, similar to encoding the position-block offsets contained in primary index field 120. For each set of positions, particular embodiments may examine the position numbers, absolute or relative, and determine the minimum number of bits necessary to encode the largest absolute or relative position in the set. Then, particular embodiments may encode all of the positions in the set using this same number of bits. Since this number of bits is sufficient to encode the largest position number in the set, it is also sufficient to encode the smaller position numbers in the set. Other suitable types of encoding schemes may be used to encode the position numbers in alternative embodiments, and the present disclosure contemplates any suitable encoding schemes. If position_delta is the set of relative position values, the set of positions may be encoded using $1 + \lfloor \log_2 (\max(\text{position\_delta})) \rfloor$ number of bits.

In particular embodiments, if the position data for a document requires more than 255 bits to encode, then that position data are placed at the end of the corresponding position block. Instead of using the minimum constant-bit encoding scheme described above to encode the large position data, particular embodiments may encode the position data that is greater than 255 bits using the exponential-Golomb (exp-Golomb) code. Briefly, to encode a non-negative integer in an order-k exponential-Golomb code, particular embodiments may (1) take the integer number in binary format except for the last k bits and add 1 to it (arithmetically), and write down the result; (2) count the digits written, subtract one, and write that number of starting zero bits preceding the previous bit string; and (3) write the last k bits in binary.

In particular embodiments, within each position block field 130, secondary index field 132 contains sixteen position-data lengths, measured in bits, for the sixteen position data fields 134 included in that position block field 130. For example, suppose token $w_j$ appears three times in document $d_{17}^j$ at positions 100, 250, and 270. Using the relative positions, the position data of $w_j$ for $d_{17}^j$ to be encoded are 100, 150 (i.e., 250−100=150), and 20 (i.e., 270−250=20). Using the minimum constant-bit encoding scheme, the largest absolute or relative position number is 150, which requires 8 bits to encode because the number 150 in binary form is 10010110. Thus, for $d_{17}^j$, all three positions are each encoded using 8 bits, which takes a total of 24 bits. In secondary index field 132 of position block 2 for $w_j$ ($d_{17}^j$ belongs to the second position block for $w_j$), the position-data length of position data 1, which corresponds to $d_{17}^j$, is thus 24 bits, because it takes 24 bits to encode the position data for $d_{17}^j$ and so position data 1 requires 24 bits of storage space.

On the other hand, if the position-data offsets are stored in secondary index field 132, then in particular embodiments, when parsing secondary index field 132 to retrieve the position data for the individual documents within an position block field 130, particular embodiments may examine the difference between two adjacent position-data offsets in secondary index field 132 to determine the total number of bits used to encode the position data for a particular document (i.e., the length of the position data for the document).

In the above example, the position data of $w_j$ for $d_{17}^j$ are encoded using a total of 24 bits; thus, the length of the position data of $w_j$ for $d_{17}^j$ is 24 bits. However, this number alone, without any other information, does not indicate whether the 24 bits is: (1) one position number encoded using 24 bits, (2) two position numbers encoded using 12 bits each, (3) three position numbers encoded using 8 bits each, (4) four position numbers encoded using 6 bits each, (5) six position numbers encoded using 4 bits each, (6) eight position numbers encoded using 3 bits each, (7) twelve position numbers encoded using 2 bits each, or (8) twenty-four position numbers encoded using 1 bit each. This ambiguity may cause problems when accessing the position data encoded in an instance of data structure 100.

To resolve this ambiguity, when encoding the position data using the minimum constant-bit encoding scheme, particular embodiments may use a table to convert between (1) the actual number of bits used to encode a set of positions, and (2) the number of positions in the set (i.e., the number of times a token appears in a document) and the number of bits used to encode each position. Appendix A includes an example conversion table, TABLE 1. Particular embodiments may further restrict that each and every position being encoded using anywhere between 7 bits to 16 bits. If all of the positions of a token in a document require less than 7 bits to encode each, these positions are still encoded using 7 bits each. On the other hand, if some of the positions of a token in a document require more than 16 bits to encode each, particular embodiments encode all of the positions in this document using the exponential-Golomb encoding scheme, not the minimum constant-bit encoding scheme. In the example case of $w_j$ and $d_{17}^j$, the restriction eliminates cases (1), (4), (5), (6), (7), and (8) as described above and only leaves cases (2) two position numbers encoded using 12 bits each, and (3) three position numbers encoded using 8 bits each, if a total of 24 bits are used to encode the positions of $w_j$ appearing in $d_{17}^j$.

However, the restriction does not resolve all ambiguities. As may be seen in the example case of $w_j$ and $d_{17}^j$, there are still two possibilities remaining. In particular embodiments, when the restriction does not resolve all ambiguities, the most probable case is encoded using the number of bits that equals the actual length of the position data, while the less probable cases are each encoded using the number of bits that equals the actual length of the position data plus one or more padding bits. If adding padding bits to an actual length of the position data results in it conflicting with another case, again, the more probable case is encoded using that number of bits and more padding bits may be added to the less probable case.

For example, for 24 bits of position data, there are two possibilities: two position numbers encoded using 12 bits each, and three position numbers encoded using 8 bits each. The second case (i.e., three position numbers encoded using 8 bits each) is more probable among the two cases. Thus, this case is encoded using 24 bits (i.e., the actual length of the position data). The first case (i.e., two position numbers encoded using 12 bits each) is less probable among the two cases. Thus, this case is encoded using 25 bits, with 1 bit padding added (i.e., the actual length of the position data plus 1 bit of padding). In other words, if a token appears in a document at three positions, and these positions may be encoded using 8 bits each, then the position data of the token for this document is encoded using 24 bits without any padding (8 bits for the first position, 8 bits for the second position, and 8 bits for the third position) in an instance of data structure 100. On the other hand, if a token appears in a document at two positions, and these positions may be encoded using 12 bits each, then the position data of the token for this document is encoded using 25 bits with 1 bit as padding (12 bits for the first position, 12 bits for the second position, and 1 bit for padding) in an instance of data structure 100. Note that the padding bits may each have a default value (e.g., 0).

In TABLE 1, the first column represents the number of bits actually used to encode the position data for a document, which may be different from the actual length of the position data because it may includes padding bits. The second column represents the number of times (i.e., positions) the token appears in the document. The third column represents the number of bits used to encode each position. And the fourth column represents the number of bits padded to the position data for a document. For example, if the position data for a document is encoded using a total of 244 bits, based on TABLE 1, the 244 bits include 20 positions encoded at 12 bits each plus 4 bits of padding. That is, the token appears in the document twenty times, and the position of each appearance is encoded using twelve bits. When accessing the position data for the document, the four padding bits may be ignored. If the position data for a document is encoded using a total of 213 bits, based on TABLE 1, the 213 bits include 15 positions encoded at 14 bits each plus 3 bits of padding. If the position data for a document is encoded using a total of 180 bits, based on TABLE 1, the 180 bits include 20 positions encoded at 9 bits each without any padding.

The following example code illustrates the function of TABLE 1. The example code and TABLE 1 are just one example derivation of such a table that assumes that shorter differences between token positions (i.e., position deltas) are more common than longer position deltas. Alternative embodiments may derive different versions of the table differently. For example, a table may be derived statistically based on the inverted index.

```
for (i=255; i>0; i--) {
    for (j=POSN_MIN_DELTA_BITS;j<=POSN_MAX_DELTA_BITS &&
        i*j<DECODETABLE_MAX_POS_LEN; j++) {
        if (!PositionDecodeTable.nTokens[i*j]) {
            PositionDecodeTable.nTokens[i*j] = i;
            PositionDecodeTable.nBits[i*j] = j;
            PositionDecodeTable.nPadding[i] [j] = 0;
        } else {
            for (t=0; i*j+t<DECODETABLE_MAX_POS_LEN; t++) {
                if (!PositionDecodeTable_nTokens[i*j+t]) {
                    PositionDecodeTable.nTokens[i*j+t] = i;
                    PositionDecodeTable.nBits[i*j+t] = j;
                    PositionDecodeTable.nPadding[i] [j] = t;
                    break;
                }
            }
        }
    }
}
```

FIG. 2 illustrates an example method that summarizes the above description for storing the position data of a token in an instance of data structure 100. Briefly, the position data of a token is divided into one or more blocks, where each block contains the position data for sixteen of the documents in which the token appears (step 210). The position-block offsets to the position blocks are stored in a primary index, and the position blocks are stored sequentially following the primary index (step 220). Within each position block, the sixteen position-data length to the sixteen sets of position data are stored in a secondary index, and the sixteen sets of position data are stored sequentially following the secondary index (step 230). Again, the last position block may have less than sixteen sets of position data.

In particular embodiments, the position data of the individual tokens, as stored, for example, in instances of data structure 100, may be use during a search process. Suppose a search query, q, includes a number of tokens, $q=\{w_1^q, \ldots, w_{n^q}^q\}$, where $n^q$ is the total number of tokens in q and $n^q \geq 1$. In particular embodiments, to determine which network documents are relevant to the search query, q, the search engine may first determine which of the network documents contain all or most of the tokens in q, and then determine, among the documents that contain all or most of the tokens in q, within which of the documents the tokens in q are located relatively closely to each other. The positions of a token within a document may be represented as the position data of the token for that document and stored in an instance of data structure 100.

For example, suppose the search query, q, includes two tokens, $w_1^q$ and $w_2^q$. By examining the documents that contain $w_1^q$ and the documents that contain $w_2^q$, a search engine may determine those documents that contain both $w_1^q$ and $w_2^q$. Suppose $w_1^q$ appears in three documents: $d_5$, $d_{23}$ and $d_{48}$; and $w_2^q$ appears in four documents: $d_{23}$, $d_{48}$, $d_{66}$, and $d_{172}$. Then two documents, $d_{23}$ and $d_{48}$, contain both tokens, $w_1^q$ and $w_2^q$, of q.

For each of the two documents, $d_{23}$ and $d_{48}$, to determine whether $w_1^q$ and $w_2^q$ are located relatively closely to each other within the document, the search engine may examine the position data of and $w_1^q$ for $d_{23}$ and $d_{48}$, respectively, to find the positions of $w_1^q$ and $w_2^q$ in $d_{23}$ and $d_{48}$, respectively, and then compare these positions.

Suppose the position data of $w_1^q$ and $w_2^q$ are stored in two different instances of data structure 100. To access the positions of $w_1^q$ in $d_{23}$, $d_{23}$ is the second document in the set of documents in which $w_1^q$ appears. Thus, the position data of $w_1^q$ for $d_{23}$ is located in position block 1 at position data 2. The first position-block offset in primary index field 120 points to the beginning memory location of position block 1. If the position-data lengths are stored in secondary index field 132, then within position block 1, the second position-data length in secondary index field 132 corresponds to position data 2. The position-data offset to the beginning memory location of position data 2 equals 128 bits (i.e., the length of secondary index field 132) plus the position-data length corresponding to position data 1 (i.e., the first position-data length in secondary index field 132). Thus, decoding primary index field 120 provides the position-block offset to position block 1, and decoding secondary index field 132 of position block 1 provides the position-data offset to position data 2 of position block 1. Decoding position data 2 of position block 1 provides the positions of $w_1^q$ in $d_{23}$. The position data of $w_1^q$ for $d_{48}$ and the position data of $w_2^q$ for $d_{23}$ and $d_{48}$ may be similarly accessed.

In particular embodiments, since each position-block offset in primary index field 120 is encoded using the same number of bits (i.e., constant-bit encoding) and this bit number is known, the position-block offsets may be decoded with a few bit operations.

In particular embodiments, within each position block field 130, there are sixteen position-data lengths in secondary index field 132, and each position-data length is encoded using one byte. For example, the first position-data length, corresponding to position data 1 within the position block, is the first byte in secondary index field 132 of the position block; the second position-data length, corresponding to position data 2 within the position block, is the second byte in secondary index field 132 of the position block; and so on. In particular embodiments, operations performed on the sixteen bytes of position-data lengths may be done using Single Instruction, Multiple Data (SIMD) processing. In general, with SIMD, the same operation may be performed on multiple data (e.g., 16 data) simultaneously.

For example, to calculate the offset from the memory location at the end of secondary index field 132 to the beginning memory location of the tenth set of positions (i.e., position data 10) in a position block field 130, three operations are needed: (1) load the secondary index (i.e., sixteen bytes corresponding to sixteen position-data lengths) into a SIMD register; (2) zero out bytes 10 through 16, which correspond to position-data lengths 10 through 16; and (3) sum the remaining bytes 1 through 9, which correspond to position-data lengths 1 through 9. To calculate the position-data offset for position data 10, 128 bits (i.e., the memory space needed for secondary index field 132) may then be added to the previous result. The position-data offset, thus computed, indicates the beginning memory location of position data 10 within position block field 130.

By referencing to TABLE 1, the number of positions in each set of positions and the number of bits used to encode each position in the set may be determined based on the number of bits actually used to encode the set of positions. In addition, TABLE 1 also indicates if there is any padding, in bits, added to the end of a set of positions. The padding, if any, may be discarded or ignored when accessing the position data of a token.

The actual token positions in a document may be obtained by performing various bit operations on the corresponding position data field 134. Note that in the case that the differences between the token positions and their proceeding positions are stored as the position data (i.e., the relative positions are stored as the position data), the values decoded from position data fields 134 may need to be adjusted accordingly. In addition, large position data (e.g., position data that require more than 255 bits to encode) may have been relocated to the end of position data block fields 130 and encoded using exponential-Golomb code. These position data may require special handling.

FIG. 3 summaries the decoding of the position data of a token for a document as described above. In particular embodiments, the positions of a token in a document may be obtained relatively quickly if the position data of the token is stored in an instance of data structure 100. For an instance of data structure 100, first, the position-block offsets stored in primary index field 120 are encoded using the same number of bits and this bit number is known prior to decoding primary index field 120. Thus, the position-block offsets in primary index field 120 may be obtained with relatively few bit operations. Moreover, in particular embodiments, the position-block offsets in primary index field 120 may be stored as a lookup table, with each position-block offset represented as a pointer pointing to the memory location at the beginning of the corresponding position block field 130. In particular embodiments, software prefetching may be applied to primary index field 120 and the position block 130. Second, the secondary index field 132 within each position block field 130 may be decoded using a small number of SIMD operations to derive the bit offset to the position data field 134. Third, in most cases, the token positions for a document are also encoded using the same number of bits and this bit number as well as the number of token positions in the document are both known, by referencing to TABLE 1, prior to decoding the position data field 134 corresponding to that document. Thus, the token positions may be obtained with relatively few bit operations. These factors contribute to significantly decreasing the number of operation cycles required for, and thus significantly increasing the speed of, decoding the position data of a token for a specific document. As a result, the positions of a token in a document may be used earlier or more often during a search process.

Figure 4:
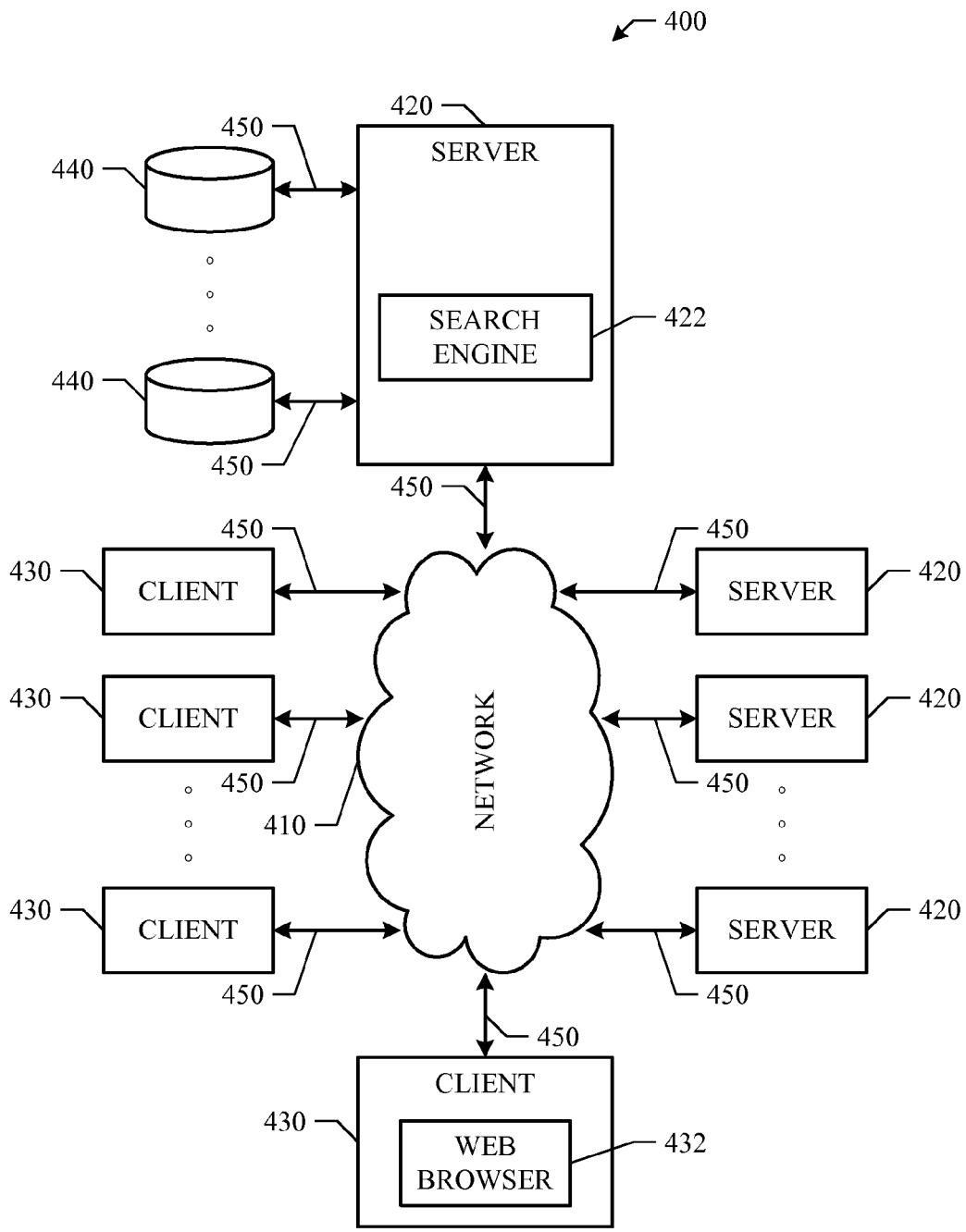
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. The present disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. The present disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, a server 420 may include a search engine 422. Search engine 422 may include hardware, software, or embedded logic components or a combination of two or more such components for carrying out the appropriate functionalities implemented or supported by search engine 422. For example and without limitation, search engine 422 may implement one or more search algorithms that may be used to identify network resources in response to the search queries received at search engine 422, one or more ranking algorithms that may be used to rank the identified network resources, one or more summarization algorithms that may be used to summarize the identified network resources, and so on. The ranking algorithms implemented by search engine 422 may be trained using the set of the training data constructed from pairs of search query and clicked URL.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiments, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. The present disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
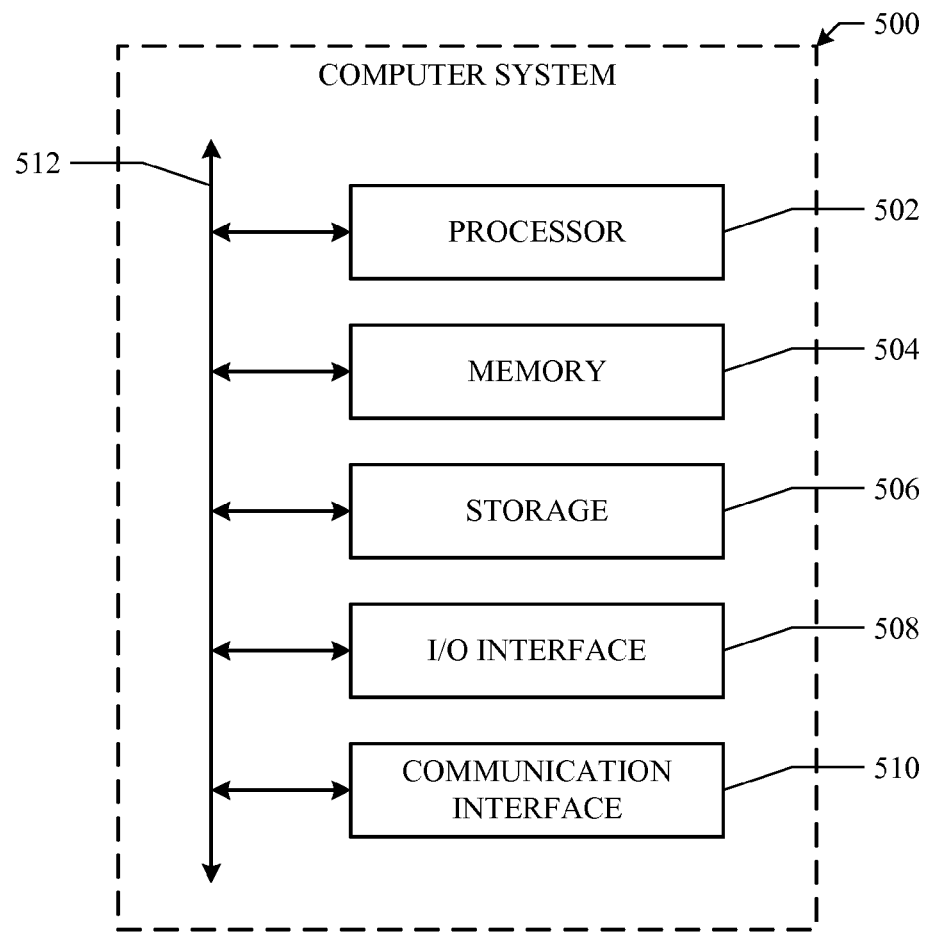
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. The present disclosure contemplates processor 502 including any suitable number of any suitable internal caches, where appropriate. As an example and not by way of limitation, processor 502 may include one or more instruction caches, one or more data caches, and one or more translation look-aside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. The present disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

TABLE 1

APPENDIX A

0: nTokens = 1, nBits = 0, nPadding = 0
1: nTokens = 1, nBits = 1, nPadding = 0
2: nTokens = 1, nBits = 2, nPadding = 0
3: nTokens = 1, nBits = 3, nPadding = 0
4: nTokens = 1, nBits = 4, nPadding = 0
5: nTokens = 1, nBits = 5, nPadding = 0
6: nTokens = 1, nBits = 6, nPadding = 0
7: nTokens = 1, nBits = 7, nPadding = 0
8: nTokens = 1, nBits = 8, nPadding = 0
9: nTokens = 1, nBits = 9, nPadding = 0
10: nTokens = 1, nBits = 10, nPadding = 0
11: nTokens = 1, nBits = 11, nPadding = 0
12: nTokens = 1, nBits = 12, nPadding = 0
13: nTokens = 1, nBits = 13, nPadding = 0
14: nTokens = 2, nBits = 7, nPadding = 0
15: nTokens = 1, nBits = 14, nPadding = 1
16: nTokens = 2, nBits = 8, nPadding = 0
17: nTokens = 1, nBits = 15, nPadding = 2
18: nTokens = 2, nBits = 9, nPadding = 0
19: nTokens = 1, nBits = 16, nPadding = 3
20: nTokens = 2, nBits = 10, nPadding = 0
21: nTokens = 3, nBits = 7, nPadding = 0
22: nTokens = 2, nBits = 11, nPadding = 0
23: nTokens = 0, nBits = 0, nPadding = 0
24: nTokens = 3, nBits = 8, nPadding = 0
25: nTokens = 2, nBits = 12, nPadding = 1
26: nTokens = 2, nBits = 13, nPadding = 0
27: nTokens = 3, nBits = 9, nPadding = 0
28: nTokens = 4, nBits = 7, nPadding = 0
29: nTokens = 2, nBits = 14, nPadding = 1
30: nTokens = 3, nBits = 10, nPadding = 0
31: nTokens = 2, nBits = 15, nPadding = 1
32: nTokens = 4, nBits = 8, nPadding = 0
33: nTokens = 3, nBits = 11, nPadding = 0
34: nTokens = 2, nBits = 16, nPadding = 2
35: nTokens = 5, nBits = 7, nPadding = 0
36: nTokens = 4, nBits = 9, nPadding = 0
37: nTokens = 3, nBits = 12, nPadding = 1
38: nTokens = 0, nBits = 0, nPadding = 0
39: nTokens = 3, nBits = 13, nPadding = 0
40: nTokens = 5, nBits = 8, nPadding = 0
41: nTokens = 4, nBits = 10, nPadding = 1
42: nTokens = 6, nBits = 7, nPadding = 0
43: nTokens = 3, nBits = 14, nPadding = 1
44: nTokens = 4, nBits = 11, nPadding = 0
45: nTokens = 5, nBits = 9, nPadding = 0
46: nTokens = 3, nBits = 15, nPadding = 1
47: nTokens = 0, nBits = 0, nPadding = 0
48: nTokens = 6, nBits = 8, nPadding = 0
49: nTokens = 7, nBits = 7, nPadding = 0
50: nTokens = 5, nBits = 10, nPadding = 0
51: nTokens = 4, nBits = 12, nPadding = 3
52: nTokens = 4, nBits = 13, nPadding = 0
53: nTokens = 3, nBits = 16, nPadding = 5
54: nTokens = 6, nBits = 9, nPadding = 0
55: nTokens = 5, nBits = 11, nPadding = 0
56: nTokens = 8, nBits = 7, nPadding = 0
57: nTokens = 7, nBits = 8, nPadding = 1
58: nTokens = 4, nBits = 14, nPadding = 2
59: nTokens = 0, nBits = 0, nPadding = 0
60: nTokens = 6, nBits = 10, nPadding = 0
61: nTokens = 5, nBits = 12, nPadding = 1
62: nTokens = 4, nBits = 15, nPadding = 2
63: nTokens = 9, nBits = 7, nPadding = 0
64: nTokens = 8, nBits = 8, nPadding = 0
65: nTokens = 7, nBits = 9, nPadding = 2
66: nTokens = 6, nBits = 11, nPadding = 0
67: nTokens = 5, nBits = 13, nPadding = 2
68: nTokens = 4, nBits = 16, nPadding = 4
69: nTokens = 0, nBits = 0, nPadding = 0
70: nTokens = 10, nBits = 7, nPadding = 0
71: nTokens = 7, nBits = 10, nPadding = 1
72: nTokens = 9, nBits = 8, nPadding = 0
73: nTokens = 8, nBits = 9, nPadding = 1
74: nTokens = 6, nBits = 12, nPadding = 2
75: nTokens = 5, nBits = 14, nPadding = 5
76: nTokens = 5, nBits = 15, nPadding = 1
77: nTokens = 11, nBits = 7, nPadding = 0
78: nTokens = 7, nBits = 11, nPadding = 1
79: nTokens = 6, nBits = 13, nPadding = 1
80: nTokens = 10, nBits = 8, nPadding = 0
81: nTokens = 9, nBits = 9, nPadding = 0
82: nTokens = 8, nBits = 10, nPadding = 2
83: nTokens = 5, nBits = 16, nPadding = 3
84: nTokens = 12, nBits = 7, nPadding = 0
85: nTokens = 7, nBits = 12, nPadding = 1
86: nTokens = 6, nBits = 14, nPadding = 2
87: nTokens = 0, nBits = 0, nPadding = 0
88: nTokens = 11, nBits = 8, nPadding = 0
89: nTokens = 8, nBits = 11, nPadding = 1
90: nTokens = 10, nBits = 9, nPadding = 0
91: nTokens = 13, nBits = 7, nPadding = 0
92: nTokens = 9, nBits = 10, nPadding = 2
93: nTokens = 7, nBits = 13, nPadding = 2
94: nTokens = 6, nBits = 15, nPadding = 4
95: nTokens = 0, nBits = 0, nPadding = 0
96: nTokens = 12, nBits = 8, nPadding = 0
97: nTokens = 8, nBits = 12, nPadding = 1
98: nTokens = 14, nBits = 7, nPadding = 0
99: nTokens = 11, nBits = 9, nPadding = 0
100: nTokens = 10, nBits = 10, nPadding = 0
101: nTokens = 9, nBits = 11, nPadding = 2
102: nTokens = 7, nBits = 14, nPadding = 4
103: nTokens = 6, nBits = 16, nPadding = 7
104: nTokens = 13, nBits = 8, nPadding = 0
105: nTokens = 15, nBits = 7, nPadding = 0
106: nTokens = 8, nBits = 13, nPadding = 2
107: nTokens = 7, nBits = 15, nPadding = 2
108: nTokens = 12, nBits = 9, nPadding = 0
109: nTokens = 9, nBits = 12, nPadding = 1
110: nTokens = 11, nBits = 10, nPadding = 0
111: nTokens = 10, nBits = 11, nPadding = 1
112: nTokens = 16, nBits = 7, nPadding = 0
113: nTokens = 14, nBits = 8, nPadding = 1
114: nTokens = 8, nBits = 14, nPadding = 2
115: nTokens = 7, nBits = 16, nPadding = 3
116: nTokens = 0, nBits = 0, nPadding = 0
117: nTokens = 13, nBits = 9, nPadding = 0
118: nTokens = 9, nBits = 13, nPadding = 1
119: nTokens = 17, nBits = 7, nPadding = 0
120: nTokens = 15, nBits = 8, nPadding = 0
121: nTokens = 12, nBits = 10, nPadding = 1
122: nTokens = 11, nBits = 11, nPadding = 1
123: nTokens = 10, nBits = 12, nPadding = 3
124: nTokens = 8, nBits = 15, nPadding = 4
125: nTokens = 0, nBits = 0, nPadding = 0
126: nTokens = 18, nBits = 7, nPadding = 0
127: nTokens = 14, nBits = 9, nPadding = 1
128: nTokens = 16, nBits = 8, nPadding = 0
129: nTokens = 9, nBits = 14, nPadding = 3
130: nTokens = 13, nBits = 10, nPadding = 0
131: nTokens = 10, nBits = 13, nPadding = 1
132: nTokens = 12, nBits = 11, nPadding = 0
133: nTokens = 19, nBits = 7, nPadding = 0
134: nTokens = 11, nBits = 12, nPadding = 2
135: nTokens = 15, nBits = 9, nPadding = 0
136: nTokens = 17, nBits = 8, nPadding = 0
137: nTokens = 9, nBits = 15, nPadding = 2
138: nTokens = 8, nBits = 16, nPadding = 10
139: nTokens = 0, nBits = 0, nPadding = 0
140: nTokens = 20, nBits = 7, nPadding = 0
141: nTokens = 14, nBits = 10, nPadding = 1
142: nTokens = 10, nBits = 14, nPadding = 2
143: nTokens = 13, nBits = 11, nPadding = 0
144: nTokens = 18, nBits = 8, nPadding = 0
145: nTokens = 16, nBits = 9, nPadding = 1
146: nTokens = 12, nBits = 12, nPadding = 2
147: nTokens = 21, nBits = 7, nPadding = 0
148: nTokens = 11, nBits = 13, nPadding = 5
149: nTokens = 9, nBits = 16, nPadding = 5
150: nTokens = 15, nBits = 10, nPadding = 0
151: nTokens = 10, nBits = 15, nPadding = 1
152: nTokens = 19, nBits = 8, nPadding = 0
153: nTokens = 17, nBits = 9, nPadding = 0
154: nTokens = 22, nBits = 7, nPadding = 0
155: nTokens = 14, nBits = 11, nPadding = 1

TABLE 1-continued

APPENDIX A

```
156: nTokens = 13, nBits = 12, nPadding = 0
157: nTokens = 12, nBits = 13, nPadding = 1
158: nTokens = 11, nBits = 14, nPadding = 4
159: nTokens = 0, nBits = 0, nPadding = 0
160: nTokens = 20, nBits = 8, nPadding = 0
161: nTokens = 23, nBits = 7, nPadding = 0
162: nTokens = 18, nBits = 9, nPadding = 0
163: nTokens = 16, nBits = 10, nPadding = 3
164: nTokens = 10, nBits = 16, nPadding = 4
165: nTokens = 15, nBits = 11, nPadding = 0
166: nTokens = 11, nBits = 15, nPadding = 1
167: nTokens = 0, nBits = 0, nPadding = 0
168: nTokens = 24, nBits = 7, nPadding = 0
169: nTokens = 21, nBits = 8, nPadding = 1
170: nTokens = 17, nBits = 10, nPadding = 0
171: nTokens = 19, nBits = 9, nPadding = 0
172: nTokens = 14, nBits = 12, nPadding = 4
173: nTokens = 13, nBits = 13, nPadding = 4
174: nTokens = 12, nBits = 14, nPadding = 6
175: nTokens = 25, nBits = 7, nPadding = 0
176: nTokens = 22, nBits = 8, nPadding = 0
177: nTokens = 16, nBits = 11, nPadding = 1
178: nTokens = 11, nBits = 16, nPadding = 2
179: nTokens = 0, nBits = 0, nPadding = 0
180: nTokens = 20, nBits = 9, nPadding = 0
181: nTokens = 18, nBits = 10, nPadding = 1
182: nTokens = 26, nBits = 7, nPadding = 0
183: nTokens = 15, nBits = 12, nPadding = 3
184: nTokens = 23, nBits = 8, nPadding = 0
185: nTokens = 14, nBits = 13, nPadding = 3
186: nTokens = 13, nBits = 14, nPadding = 4
187: nTokens = 17, nBits = 11, nPadding = 0
188: nTokens = 12, nBits = 15, nPadding = 8
189: nTokens = 27, nBits = 7, nPadding = 0
190: nTokens = 21, nBits = 9, nPadding = 1
191: nTokens = 19, nBits = 10, nPadding = 1
192: nTokens = 24, nBits = 8, nPadding = 0
193: nTokens = 16, nBits = 12, nPadding = 1
194: nTokens = 12, nBits = 16, nPadding = 2
195: nTokens = 15, nBits = 13, nPadding = 0
196: nTokens = 28, nBits = 7, nPadding = 0
197: nTokens = 14, nBits = 14, nPadding = 1
198: nTokens = 22, nBits = 9, nPadding = 0
199: nTokens = 18, nBits = 11, nPadding = 1
200: nTokens = 25, nBits = 8, nPadding = 0
201: nTokens = 20, nBits = 10, nPadding = 1
202: nTokens = 13, nBits = 15, nPadding = 7
203: nTokens = 29, nBits = 7, nPadding = 0
204: nTokens = 17, nBits = 12, nPadding = 0
205: nTokens = 0, nBits = 0, nPadding = 0
206: nTokens = 0, nBits = 0, nPadding = 0
207: nTokens = 23, nBits = 9, nPadding = 0
208: nTokens = 26, nBits = 8, nPadding = 0
209: nTokens = 19, nBits = 11, nPadding = 0
210: nTokens = 30, nBits = 7, nPadding = 0
211: nTokens = 21, nBits = 10, nPadding = 1
212: nTokens = 16, nBits = 13, nPadding = 4
213: nTokens = 15, nBits = 14, nPadding = 3
214: nTokens = 14, nBits = 15, nPadding = 4
215: nTokens = 13, nBits = 16, nPadding = 7
216: nTokens = 27, nBits = 8, nPadding = 0
217: nTokens = 31, nBits = 7, nPadding = 0
218: nTokens = 24, nBits = 9, nPadding = 2
219: nTokens = 18, nBits = 12, nPadding = 3
220: nTokens = 22, nBits = 10, nPadding = 0
221: nTokens = 20, nBits = 11, nPadding = 1
222: nTokens = 17, nBits = 13, nPadding = 1
223: nTokens = 0, nBits = 0, nPadding = 0
224: nTokens = 32, nBits = 7, nPadding = 0
225: nTokens = 28, nBits = 8, nPadding = 1
226: nTokens = 25, nBits = 9, nPadding = 1
227: nTokens = 16, nBits = 14, nPadding = 3
228: nTokens = 19, nBits = 12, nPadding = 0
229: nTokens = 15, nBits = 15, nPadding = 4
230: nTokens = 23, nBits = 10, nPadding = 0
231: nTokens = 33, nBits = 7, nPadding = 0
232: nTokens = 29, nBits = 8, nPadding = 0
233: nTokens = 21, nBits = 11, nPadding = 2
234: nTokens = 26, nBits = 9, nPadding = 0
235: nTokens = 18, nBits = 13, nPadding = 1
236: nTokens = 14, nBits = 16, nPadding = 12
237: nTokens = 0, nBits = 0, nPadding = 0
238: nTokens = 34, nBits = 7, nPadding = 0
239: nTokens = 17, nBits = 14, nPadding = 1
240: nTokens = 30, nBits = 8, nPadding = 0
241: nTokens = 24, nBits = 10, nPadding = 1
242: nTokens = 22, nBits = 11, nPadding = 0
243: nTokens = 27, nBits = 9, nPadding = 0
244: nTokens = 20, nBits = 12, nPadding = 4
245: nTokens = 35, nBits = 7, nPadding = 0
246: nTokens = 16, nBits = 15, nPadding = 6
247: nTokens = 19, nBits = 13, nPadding = 0
248: nTokens = 31, nBits = 8, nPadding = 0
249: nTokens = 15, nBits = 16, nPadding = 9
250: nTokens = 25, nBits = 10, nPadding = 0
251: nTokens = 0, nBits = 0, nPadding = 0
252: nTokens = 36, nBits = 7, nPadding = 0
253: nTokens = 28, nBits = 9, nPadding = 1
254: nTokens = 23, nBits = 11, nPadding = 1
255: nTokens = 21, nBits = 12, nPadding = 3
```

What is claimed is:

1. A machine-readable non-transitory medium storing a data structure for access by an application executed by a process, the data structure comprising:
   a primary index comprising a plurality of position-block references; and
   a plurality of position blocks sequentially following each other and starting from an end position of the primary index, wherein:
      each of the position-block references corresponds to a position-block offset equal to an offset from a beginning memory location of the data structure to a beginning memory location of a corresponding position block; and
      each of the position blocks comprises:
         a secondary index comprising a plurality of position-data references; and
         a plurality of position data fields sequentially following each other and starting from an end position of the secondary index, wherein:
            each of the plurality of position data fields comprises a first position and one or more subsequent positions,
            the first position is equal to an offset from a beginning memory location of the position data field to a beginning memory location of the first position, and
            each of the one or more subsequent positions is equal to a difference between a beginning memory location of the subsequent position and a beginning memory location of another position immediately preceding the subsequent position in the position data field.

2. The medium of claim 1, wherein an instance of the data structure is used to encode position data of a token for one or more documents in which the token appears, wherein:
   the token comprises one or more alphabetical letters, numerical digits, or symbols;
   the position data of the token comprises all of the position data fields in all of the position blocks; and
   each one of the position data fields comprises one or more positions at which the token appears in one of the documents.

3. The medium of claim 2, wherein for each one of the position data fields, each one of the positions is encoded using a same number of bits that equals the minimum number of bits necessary to encode the largest one of the positions.

4. The medium of claim 2, wherein for each one of the position blocks, the position block further comprises one or more padding bits following one or more of the position data fields in the position block.

5. The medium of claim 1, wherein each one of the position-block offsets in the primary index references a memory location at the beginning of the corresponding one of the position blocks.

6. The medium of claim 1, wherein each one of the position-data lengths in the secondary index in each one of the position blocks is encoded using one byte.

7. The medium of claim 1, wherein:
   each one of the position blocks, except the last one of the position blocks, comprises a same number of position data fields; and
   the last one of the position blocks comprises the same number or less than the number of position data fields contained in other ones of the position blocks.

8. The medium of claim 7, wherein:
   each one of the position blocks, except the last one of the position blocks, comprises sixteen position data fields; and
   the last one of the position blocks comprises sixteen or less than sixteen position data fields.

* * * * *